United States Patent Office 3,258,506
Patented June 28, 1966

3,258,506
BLEND OF (1) GRAFT COPOLYMER OF STYRENE ON BUTADIENE-DIBUTYL FUMARATE COPOLYMER WITH (2) STYRENE-ACRYLONITRILE COPOLYMER
Hans Peter Siebel, Limburgerhof, Pfalz, Guenther Daumiller, Ziegelhausen, and Alfred Hauss and Hans-Werner Otto, Ludwigshafen (Rhine), Germany, assignors to Badische Anilin- & Soda-Fabrik Aktiengesellschaft, Ludwigshafen (Rhine), Germany
No Drawing. Filed May 27, 1964, Ser. No. 370,707
Claims priority, application Germany, June 11, 1963, B 72,248
11 Claims. (Cl. 260—876)

This invention relates to a process for the production of impact-resistant thermoplastic molding compounds or compositions which are distinguished by good surface character of the injection moldings prepared therefrom, pale natural color, and good physical properties and processability.

Many impact-resistant molding compounds and methods for their production are already known. These molding compounds are generally mixtures or copolymers of monomers which form hard and brittle polymers and those having relatively low second order transition temperatures or "glass temperatures" which are below 0° C. and preferably below 20° C.

Impact-resistant polystyrene may be prepared by polymerizing styrene in the presence of a rubber component or elastomeric polymers or by mixing polystyrene with natural or synthetic rubber. In this way however impact-resistant polymers are obtained which do not exhibit satisfactory surface hardness for all applications. For this reason, not only styrene but also mixtures of styrene and acrylonitrile have been polymerized in the presence of elastomeric polymers. The surface hardness is thus improved and at the same time an improvement is achieved in solvent resistance and resistance to weathering.

Copolymers of styrene and acrylonitrile are also known which although completely transparent are not highly impact-resistant.

Polymers or copolymers or polymer compositions which are impact-resistant and at the same time resistant to aging are also obtained by mixing a component which is elastomeric at room temperature and which is slightly crosslinked, with a homopolymer or copolymer of monomers which when polymerized alone form hard and brittle polymers, or by polymerizing the monomers forming the hard component in the presence of slightly crosslinked elastomeric polymers or elastomeric polymers which crosslink under the reaction conditions. Another possibility for obtaining impact-resistant and at the same time aging resistant thermoplastic molding compounds comprises mixing a hard and brittle polymer with a polymer which is elastomeric at room temperature so that there is reaction between functional groups present in the polymers which are capable of reacting with each other with the formation of principal valences. Intermolecular crosslinking between the hard and soft components occurs in these compositions. The soft components in this prior art method are preferably those which contain only a very small number of diene units or none at all.

Although impact-resistant molding compounds which are very interesting industrially are obtained by the said prior art methods, they have certain disadvantages which limit their usefulness. In practice, a hard and homogeneous surface combined with good processability are required.

Impact-resistant thermoplastic molding compounds which contain copolymers of 20 to 70% by weight of butadiene and 80 to 30% by weight of dibutyl fumarate and have been mixed with compounds forming hard and brittle polymers are also known. Impact-resistant compounds which have relatively good mechanical properties are obtained by this prior art method. The flow properties and the relatively low homogeneity of such plastics compositions are unsatisfactory.

We have now found that impact-resistant thermoplastic molding compositions which do not have the above disadvantages are obtained when:

(a) A copolymer I is first prepared by a conventional method from (A) 80 to 40% by weight of dibutyl fumarate and (B) 20 to 60% by weight of butadiene by polymerization of the monomers in aqueous emulsion (the sum of the percentages being 100; the preferred molar ratio of dibutyl fumarate to butadiene being about 1:2 to 1:4);

(b) 20 to 100% by weight (with reference to copolymer I) of styrene or a mixture of styrene and acrylonitrile containing up to 30% by weight of acrylonitrile is added and the mixture obtained is polymerized in emulsion to form component II; and (c) Component II is mixed with a copolymer III of styrene and acrylonitrile in the weight ratio of 70:30 to 90:10 so that in the total mixture from 10 to 35% by weight of component I (with reference to the solids content of the total mixture) is present.

In the process according to this invention, a rubberlike or elastomeric copolymer I is first prepared by polymerization of certain monomers in aqueous emulsion. The comonomers which form copolymer I are (A) dibutyl fumarate which makes up an amount of from 40 to 80% by weight and (B) butadiene which makes up an amount of 20 to 60%, preferably about 35 to 45% by weight of the comonomers. It is also possible to use, instead of butadiene and dibutyl fumarate alone, a mixture of these components with other polymerizable compounds, such as acrylonitrile, acrylic esters, methacrylic esters, vinyl ketones, vinyl esters or vinyl ethers. In addition to acrylonitrile, other specific monomers which may be copolymerized with butadiene and dibutyl fumarate are as follows: methyl acrylate, ethyl acrylate, butyl acrylate, vinyl acetate or vinyl propionate. These further comonomers should however participate in the composition of the polymer I only in minor amounts representing up to about 20% by weight, preferably not more than about 10% by weight, with reference to polymer I. The ratio of the components (A) and (B) should be within the stated limits, e.g. a molar ratio of (A):(B) of approximately 1:3.

Copolymer I is prepared by polymerizing the monomers in a conventional way in aqueous emulsion. Conventional emulsifiers are used, such as sodium salts of paraffinsulfonic acids having twelve to eighteen carbon atoms, arylsulfonates, sodium salts of fatty acids having about sixteen to eighteen carbon atoms, fatty alcohol sulfates having about twelve to eighteen carbon atoms and similar emulsifiers in amounts of about 0.1 to 4.5% by weight, and in general free radical forming compounds, such as persulfates, peroxides or hydroperoxides are used as polymerization initiators. Redox systems which yield free radicals, such as cumene hydroperoxides in conjunction with sodium hydroxymethyl sulfinate are preferably used. Activation may advantageously be carried out with small amounts of ferrous ethylene diamine tetraacetic acid complex. Amine activators, such as triethanolamine, often lead to undesirable discoloration of the rubber. The activated redox system permits the polymerization to be carried out at low temperatures, e.g. 15° to 45° C., at a sufficiently high reaction speed and thus suppresses to a great extent the undesirable competitive reaction leading to the formation of the Diels- Alder adduct of the two comonomers. It has further been found that rubber prepared in this way from butadiene and dibutyl fumarate may be polymerized to high conversions without appreciable crosslinking.

Styrene or if desired a mixture of styrene and acrylonitrile with up to 30% by weight of acrylonitrile is then polymerized in aqueous emulsion onto the elastomeric copolymer I at a temperature of about 45° to 100° C. Normally styrene, and acrylonitrile when used, is added to the dispersion of copolymer I and it may be advantageous to add further emulsifiers or polymerization initiators. The polymerization initiators which are used in this second polymerization stage are preferably initiators which are soluble in the monomers, i.e. soluble in styrene and acrylonitrile, such as organic peroxides and azo compounds, for example benzoyl peroxide, lauroyl peroxide or azodiisobutyrodinitrile. It is often advantageous to use additionally small amounts of water-soluble polymerization initiators in the second process stage.

The amount of emulsifier in the first stage of the polymerization in the production of polymer I is advantageously chosen from the start so that it is unnecessary to add further emulsifier when the styrene and optionally acrylonitrile is polymerized onto the copolymer I. Styrene and (when used) acrylonitrile are polymerized onto the copolymer I in amounts of 20 to 100% by weight, preferably 25 to 80% by weight, with reference to the copolymer I. This relatively wide range results from the possibility of variations in the process. The amount of styrene and (when used) acrylonitrile and to a certain extent the ratio of styrene to acrylonitrile are dependent inter alia on the quantitative composition of the copolymer I. The degree in which styrene and (when used) acrylonitrile are grafted onto the preformed copolymer I (i.e. the degree of grafting) can also be influenced by the range of amounts in which styrene and (when used) acrylonitrile are polymerized onto the copolymer I, together with the other reaction conditons, such as temperature and the like. This range of amounts is however also dependent on the third process stage hereinafter described.

Component II, which is formed by polymerizing and grafting styrene and (when used) acrylonitrile onto the copolymer I, is mixed according to this invention with a copolymer of styrene and acrylonitrile, and the ratio of styrene to acrylonitrile may be from 60:40 to 90:10, preferably from about 10:30 to 80:20. Mixing of the component II with copolymer III so as to obtain a uniform homogeneous composition may be effected in various ways. A preferred embodiment is by adding an aqueous dispersion of component II to a suspension of copolymer III in methanol. Particularly efficient mixing of the polymers is thus achieved.

It is also possible to mix an aqueous dispersion of component II with an aqueous dispersion of copolymer III and then precipitate the two dispersions together or work them up by drying.

Furthermore the polymers may be mixed together in powder form in an extruder or on mixing rolls.

The proportions in which copolymer III of styrene and acrylonitrile is mixed with component II are variable and depend on the way in which component II has been made. To achieve high-quality molding compounds having the properties described above it is essential that 10 to 35% by weight, preferably 15 to 22% by weight, of the elastomeric component I should be contained in the total composition.

The impact-resistant thermoplastic molding compounds prepared according to this invention are distinguished by only slight natural color, good homogeneity of injection moldings prepared therefrom, high resistance to mechanical stresses, outstanding resistance to cold and excellent flow properties.

The invention is further illustrated by the following examples. The ratios, parts and percentages specified in the examples are by weight unless otherwise indicated.

EXAMPLE 1

Polymer I

An emulsion consisting of 17,600 parts of water, 5,840 parts of dibutyl fumarate, 4,160 parts of butadine (molar ratio of the comonomers 1:3), 150 parts of a sodium salt of a paraffinsulfonic acid ($C_{12}$ to $C_{18}$), 15 parts of tertiary-butylcumene hydroperoxide, 10 parts of sodium hydroxymethylsulfinate dihydrate, 1.5 parts of tetrasodium ethylene diamine tetraacetate and 0.085 part of ferrous sulfate heptahydrate is polymerized under nitrogen at $+20°$ C. in a pressure-tight vessel. It is advantageous to proceed by placing one fifth of the monomer mixture with the whole of the hydroperoxide in the soap solution and supplying during the course of eight hours through two separate feeds (a) the remainder of the monomer mixture and (b) the sodium hydroxymethylsulfinate dihydrate (dissolved in water for better metering) with the iron complex activator. The reaction is practically over in twenty hours. (Conversion after sixteen hours: 72%, after twenty-two hours: 94%, after forty-five hours: 98%.) No coagulate is observed. In cyclohexanone the dispersion passes into solution with slight cloudiness. The K-value according to Fikentscher is 60. The second order transition point of the rubber is $-60°$ C.

Polymer II 640 parts of water and 0.68 part of potassium persulfate are added to 2,990 parts of the dispersion of polymer I having a solids content of 34% and then at a temperature of 70° C. while stirring 340 parts of a mixture of styrene and acrylonitrile in the weight ratio of 75:25 is added which contains 1.3 parts of lauroyl peroxide dissolved therein. An aqueous about 27% polymer dispersion is obtained.

Polymer III

The aqueous dispersion of polymer II is allowed to flow into a suspension in methanol of fine suspension beads of a copolymer of styrene and acrylonitrile (75:25) while stirring. The proportion of methanol required to precipitate the dispersion is about three times the amount of polymer dispersion introduced. The coagulate mixes in a finely divided form and intensely with the styrene-acrylonitrile copolymer. The solid product obtained is separated and dried. The free-flowing powder is processed in screw extruders. The plastics materials having different rubber contents obtained by mixing are almost colorless and permit coloration in pale pastel shades. Injection moldings prepared from the material have a uniform surface without flow lines and good scratch resistance. The softening points of the thermoplastic precessable compositions are approximately $+100°$ C. The material has excellent properties both at room temperature and in the cold owing to the low glass temperature ($-50°$ C.) of the grafted elastomeric components. Table 1 reproduces the results of measurements of notched impact strength carried out on molded test specimens at different temperatures, and Table 2 reproduces values of the notched impact strength and impact strength according to DIN 53,453 ascertained at different rubber contents and also the statically measured modulus of elasticity.

TABLE 1

| Percent rubber content (polymer I) | 10.0 | 12.5 | 15.0 | 17.5 | 20.0 |
|---|---|---|---|---|---|
| | Notched impact strength, cm. kg./cm.² | | | | |
| Test temperature in ° C.: | | | | | |
| +20 | 8 | 11 | 20 | 31 | 40 |
| −20 | 5 | 7 | 9 | 12 | 17 |
| −40 | 3 | 4 | 6 | 8 | 13 |
| −60 | 1 | 2 | 2 | 3 | 3 |

TABLE 2

|  | Rubber content in percent by weight (polymer I) | | | | |
| --- | --- | --- | --- | --- | --- |
|  | 10.0 | 12.5 | 15.0 | 17.5 | 20.0 |
| Impact strength (cm. kg./sq. cm.) | 60 | 108 | 122 | [1] 117 | [1] 109 |
| Notched impact strength (cm. kg./sq. cm.) | 5 | 6 | 10 | 17 | 21 |
| Static modulus of elasticity (kg./sq. cm.) | 26,700 | 25,500 | 23,800 | 21,600 | 18,700 |

[1] Test specimen not completely broken.

EXAMPLE 2

Polymer I 5,600 parts of water is placed in a pressure resistant vessel, 15 parts of potassium chloride is dissolved therein and a mixture of 680 parts of dibutyl fumarate and 320 parts of butadiene (one fifth of the total amount of monomers in the molar ratio 1:2) is emulsified therein by means of 650 parts of an aqueous 20% solution of sodium alkyl sulfonates ($C_{12}$ to $C_{18}$). Water cooling keeps the temperature of the reaction mixture at +14° C. Uniform supply of the remainder of the monomers and the reaction accelerator is effected through three separate feeds within eight hours. The first feed consists of 2,720 parts of dibutyl fumarate and 1,280 parts of butadiene. The second supply vessel contains 5 parts of sodium hydroxymethylsulfinate dihydrate, 0.75 part of tetrasodium ethylene diamine tetraacetate and 0.043 part of ferrous sulfate heptahydrate dissolved in 1500 parts of water. An emulsion of 7.5 parts of tertiary-butylcumene hydroperoxide in 2000 parts of an aqueous 5% solution of sodium alkyl sulfonates to which additionally 400 parts of methanol has been added forms the third feed. The polymerization, carried out under nitrogen, is over after forty-eight hours with a conversion of 90%. The second order transition point of the colorless rubber is −50° C.

Polymer II

A monomer mixture of styrene and acrylonitrile (ratio of the monomers 75:25) is supplied within three hours at +70° C. and thereby polymerized onto the said rubber emulsion having a solids content of 31.0%. 0.2% of potassium peroxide disulfate in the aqueous phase and 0.3% of lauroyl peroxide in the monomer phase are used as initiators, both percentages being with reference to the amount of monomers to be polymerized on. The amount of the monomer mixture to be polymerized on is varied, with reference to the amount of rubber, in the ratio 1:1, 1:2 and 1:3, the rubber emulsion being diluted with water prior to the commencement of the addition of monomers so that it has a solids content of about 30% after the reaction has ended. Further processing is carried out in the way described in Example 1 by adjusting the rubber component in the rubber mixture to 20%.

Polymer III

The impact-resistant molding compounds obtained with the same rubber content but different proportions of polymerized-on component, exhibit increasing transparency with increasing concentration of the polymerized-on monomers. The notched impact strengths in kg. cm./sq. cm. at +20° C. measured on molded test specimens are as follows:

|  | Ratio of polymerized-on monomer to rubber (polymer I): | | |
| --- | --- | --- | --- |
|  | 1:1 | 1:2 | 1:3 |
| Notched impact strength (cm. kg./sq. cm.) | 4 | 22 | 19 |

EXAMPLE 3

An emulsion is polymerized as in Example 2 but with a monomer mixture of 2570 parts of dibutyl fumarate and 2430 parts of butadiene (molar ratio 1:4) during forty-eight hours at a temperature of +12° C. up to a 90% conversion under nitrogen. For the polymerization of a monomer mixture of styrene and acrylonitrile (75:25) onto polymer I at 75° C. under the conditions specified in Example 2 different concentration ratios of monomers to rubber are used. The processed impact-resistant materials, adjusted to 20% proportion of rubber, have a softening point of 98° to 101° C. Here again increasing transparency of the material is observed with increasing concentration of the monomers polymerized on. The colorless to ivory colored plastics materials exhibit very good notched impact strength.

|  | Ratio of polymerized-on monomer to rubber (polymer I): | | | | |
| --- | --- | --- | --- | --- | --- |
|  | 1:1 | 1:2 | 1:3 | 1:4 | 1:5 |
| Notched impact strength (cm. kg./sq. cm.) of molded test specimens at +20° C | 8 | 48 | 39 | 7 | 6 |

The mechanical properties may also be adjusted to a desired extent by the amount of rubber in the impact-resistant mixtures at a constant ratio of polymerized-on monomers to rubber of 1:3. A summary of the notched impact strength of molded test specimens with their impact strength and notched impact strength according to DIN 53,453 and the tensile strength, ultimate tensile strength and elongation is given in the following table:

| Percent by weight of rubber (polymer I) in the mixture | 10.0 | 12.5 | 15.0 | 17.5 | 20.0 |
| --- | --- | --- | --- | --- | --- |
| Notched impact strength (kg. cm./sq. cm.) test specimen at— | | | | | |
| +20° C | 8 | 10 | 20 | 34 | 48 |
| −20° C | 4 | 6 | 10 | 15 | 34 |
| −40° C | 2 | 4 | 6 | 8 | 16 |
| −60° C | 2 | 3 | 3 | 4 | 8 |
| Notched impact strength (cm. kg./sq. cm.) | 5 | 8 | 13 | 17 | 22 |
| Impact strength according to DIN at +20° C. (cm. kg./sq. cm.) | 55 | 94 | 116 | [1] 113 | [1] 90 |
| Tensile strength and ultimate tensile strength (kg./sq. cm.) | 880.790 | 720.560 | 670.490 | 640.460 | 510.370 |
| Elongation, percent | 20 | 25 | 27 | 33 | 35 |
| Softening point, °C | +101 | +101 | +100 | +100 | +98 |

[1] Standard test specimen not completely broken.

The strength data determined according to DIN are average values over the injection temperatures from 160° to 260° C. at intervals of 20° C. each. As cold testing shows, the plastics materials have an excellent cold impact strength.

EXAMPLE 4

An emulsion containing 5840 parts of dibutyl fumarate and 4160 parts of butadiene (molar ratio 1:3) is polymerized at +20° C. under the conditions specified in Example 1. The conversion is 96%. Polymerizing-on of the monomer mixture takes place under the conditions described in Example 2 at a constant polymerizing-on ratio of 1:3 of rubber-monomers but with different proportions of styrene to acrylonitrile in the mixture of monomers to be polymerized on, namely 75:25, 90:10 and 100:0. After precipitation and mixing of the modified rubber with a suspension copolymer of styrene and acrylonitrile to a content of 20% of the elastomeric component in the plastics composition, there are achieved with increasing styrene content of the monomer mixture to be polymerized-on, an improvement in the transparency of molding prepared therefrom and an improvement in surface gloss and in the flow of the plastics material. Diminution in the impact strength runs parallel therewith.

| | Ratio of monomers/styrene:acrylonitrile | | | | | |
|---|---|---|---|---|---|---|
| | 75/25 | 80/20 | 85/15 | 90/10 | 95/5 | 100/0 |
| Notch impact strength (kg. cm./sq. cm.) on molded test rod | 37 | 35 | 17 | 8 | 5 | 3 |
| Brabender value (kp.) at 220° C. after ten minutes | 7.0 | 6.7 | 6.3 | 6.2 | 6.0 | 5.5 |
| Refractive index $\eta_{16}$ of polymer II | 1.5049 | | | | | 1.5149 |

Refractive index $\eta_{16}$ of polymer I = 1.4911.
Refractive index $\eta_{16}$ of styrene/acrylonitrile copolymer (75:25) = 1.5668.

The influence of the ratio in which the monomers styrene/acrylonitrile (75:25) are polymerized on to the polymer I is shown in the following summary with reference to the notch impact strength, measured at +20° C. on a molded test rod in a plastics composition adjusted to 20% of polymer I:

| | Polymerizing on ratio of monomers:rubber (polymer I) | | |
|---|---|---|---|
| | 1:1 | 1:2 | 1:3 |
| Notch impact strength (kg. cm./sq. cm.) (molded test rod) | 50 | 50 | 40 |

EXAMPLE 5

An emulsion consisting of 15,100 parts of water, 1,500 parts of a 20% aqueous solution of sodium paraffin sulfonates ($C_{12}$ to $C_{18}$), 5,480 parts of dibutyl fumarate, 3,890 parts of butadiene and 630 parts of acrylonitrile is polymerized under the conditions specified in Example 1. A monomer mixture of styrene and acrylonitrile in the weight ratio 75:25 is polymerized on to the resultant 33% aqueous rubber dispersion (polymer I), the total amount of monomers being chosen so that it makes up 33% by weight of the dispersion. Then follows mixing of the copolymer formed with a styrene/acrylonitrile copolymer (75:25) so that the rubber component content is 20%. Moldings prepared therefrom have not only a pale natural color but also a scratchproof, homogeneous surface having a high gloss.

PROPERTIES OF THE PRODUCT

Kg. cm./sq. cm.
Notch impact strength (molded test rod) _____ 52
Impact strength according to DIN 53453_____ 100
Notch impact strength (DIN 53453) _____ 23

EXAMPLE 6

The procedure of Example 5 is followed but 4800 parts of dibutyl fumarate, 3440 parts of butadiene and 1760 parts of methylisopropenyl ketone are used.

PROPERTIES OF THE PRODUCT

Notch impact strength (molded test rod) ____kg. cm./sq. cm.__ 42
Impact strength according to DIN 53453 ____kg. cm./sq. cm.__ 103
Notch impact strength according to DIN 53453 ____kg. cm./sq. cm.__ 10
Tensile strength according to DIN 53371 ____kg./sq. cm.__ 650
Ultimate tensile strength according to DIN 53371 ____kg./sq. cm.__ 450
Elongation ____percent__ 25

We claim:
1. An impact-resistant thermoplastic molding composition comprising a homogeneous mixture of:
   (A) a graft copolymer consisting essentially of
      (I) a copolymer of dibutyl fumarate and butadiene in a weight ratio of about 80:20 to 40:60 to which there has been grafted
      (II) 20 to 100% by weight, with reference to Component (I), of a monomeric reactant selected from the group consisting of styrene and a mixture of styrene with up to 30% by weight of acrylonitrile, with reference to the styrene-acrylonitrile mixture;
   and
   (B) a copolymer of styrene and acrylonitrile in a weight ratio of 60:40 to 90:10, the weight ratio of (A) to (B) being 70:30 to 90:10 with the proviso that Component (I) is present in an amount of 10 to 35% by weight, with reference to the total mixture.
2. A composition as claimed in claim 1 wherein the molar ratio of dibutyl fumarate to butadiene is about 1:2 to 1:4.
3. A composition as claimed in claim 1 wherein the weight ratio of dibutyl fumarate to butadiene is 65:35 to 55:45.
4. An impact-resistant thermoplastic molding composition comprising a homogeneous mixture of:
   (A) a graft copolymer consisting essentially of
      (I) an elastomeric copolymer of dibutyl fumarate and butadiene in a weight ratio of about 80:20 to 40:60 to which there has been grafted
      (II) 20 to 100% by weight, with reference to Component I, of a mixture of styrene with up to 30% by weight of acrylonitrile, with reference to the styrene-acrylonitrile mixture;
   and
   (B) a copolymer of styrene and acrylonitrile in a weight ratio of 60:40 to 90:10, the weight ratio of (A) to (B) being 70:30 to 90:10 with the proviso that Component (I) is present in an amount of 10 to 35% by weight, with reference to the total mixture.
5. A composition as claimed in claim 4 wherein the molar ratio of dibutyl fumarate to butadiene is about 1:2 to 1:4.
6. A composition as claimed in claim 4 wherein the weight ratio of dibutyl fumarate to butadiene is 65:35 to 55:45.

7. An impact-resistant thermoplastic molding composition comprising a homogeneous mixture of
(A) a graft copolymer consisting essentially of
  (I) an elastomeric copolymer of
    (a) dibutyl fumarate,
    (b) butadiene and
    (c) up to 20% by weight, with reference to said elastomeric copolymer, of a monomer selected from the group consisting of acrylonitrile, acrylic esters, methacrylic esters, vinyl ketones, vinyl esters and vinyl ethers,
  the weight ratio of (a):(b) being about 80:20 to 40:60, to which elastomeric copolymer there has been grafted
  (II) 20 to 100% by weight, with reference to Component (I), of a monomeric reactant selected from the group consisting of styrene and a mixture of styrene with up to 30% by weight of acrylonitrile, with reference to the styrene acrylonitrile mixture;
and
(B) a copolymer of styrene and acrylonitrile in a weight ratio of 60:40 to 90:10, the weight ratio of (A) to (B) being 70:30 to 90:10 with the proviso that Component (I) is present in an amount of 10 to 35% by weight, with reference to the total mixture.

8. A composition as claimed in claim 7 wherein the molar ratio of (a):(b) is about 1:2 to 1:4.

9. A composition as claimed in claim 7 wherein the molar ratio of (a):(b) is approximately 1:3.

10. A composition as claimed in claim 9 wherein monomer (c) is acrylonitrile.

11. A process for the production of an impact-resistant thermoplastic molding composition which comprises:
(a) preparing a copolymer I by copolymerizing in an aqueous emulsion 80 to 40% by weight of dibutyl fumarate and 20 to 60% by weight of butadiene;
(b) adding 20 to 100% by weight, with reference to copolymer I, of a monomeric reactant selected from the group consisting of styrene and a mixture of styrene with up to 30% by weight of acrylonitrile, with reference to the styrene-acrylonitrile mixture, and graft-polymerizing said monomeric reactant to said copolymer I in aqueous emulsion and in the presence of a free radical polymerization catalyst to form a graft copolymer II;
and
(c) homogeneously mixing the resulting graft copolymer II of steps (a) and (b) with a copolymer III of styrene and acrylonitrile having the weight ratio of styrene:acrylonitrile of about 60:40 to 90:10, the weight ratio of graft copolymer II to copolymer III being 70:30 to 90:10 with the proviso that copolymer I is present in an amount of 10 to 35% by weight with reference to the solids content of the total mixture.

References Cited by the Examiner
UNITED STATES PATENTS

| | | | |
|---|---|---|---|
| 2,789,961 | 4/1957 | Hoelscher | 260—892 |
| 2,802,808 | 8/1957 | Hayes | 260—876 |
| 2,820,773 | 1/1958 | Childers et al. | 260—880 |

MURRAY TILLMAN, *Primary Examiner.*

G. F. LESMES, *Assistant Examiner.*